No. 829,426. PATENTED AUG. 28, 1906.
J. & T. PICKERING.
HEN'S NEST.
APPLICATION FILED MAR. 29, 1905.

WITNESSES:

INVENTORS
Joshua Pickering
Thomas Pickering
BY Ridout & Maybee
ATTORNEYS

UNITED STATES PATENT OFFICE.

JOSHUA PICKERING AND THOMAS PICKERING, OF PARIS, CANADA.

HEN'S NEST.

No. 829,426.   Specification of Letters Patent.   Patented Aug. 28, 1906.

Application filed March 29, 1905. Serial No. 252,784.

*To all whom it may concern:*

Be it known that we, JOSHUA PICKERING and THOMAS PICKERING, citizens of the Dominion of Canada, residing at the town of Paris, in the county of Brant and Province of Ontario, Canada, have invented certain new and useful Improvements in Hens' Nests, of which the following is a specification.

Our invention relates to a nest for hens in which newly-laid eggs are discharged from the nest-bottom into a separate compartment; and our object is to devise a simple, convenient, and effective construction for the purpose.

With this object in view our invention consists, essentially, of a covered nest-frame provided with an opening for the hens and a flexible nest-bottom inclined to one side, where a suitable aperture for the discharge of eggs is provided, of a receptacle provided with a flexible bottom and having a hinged connection with the nest-frame, and of means for breaking the fall of the eggs, all substantially as hereinafter more specifically described and then definitely claimed.

Figure 1:
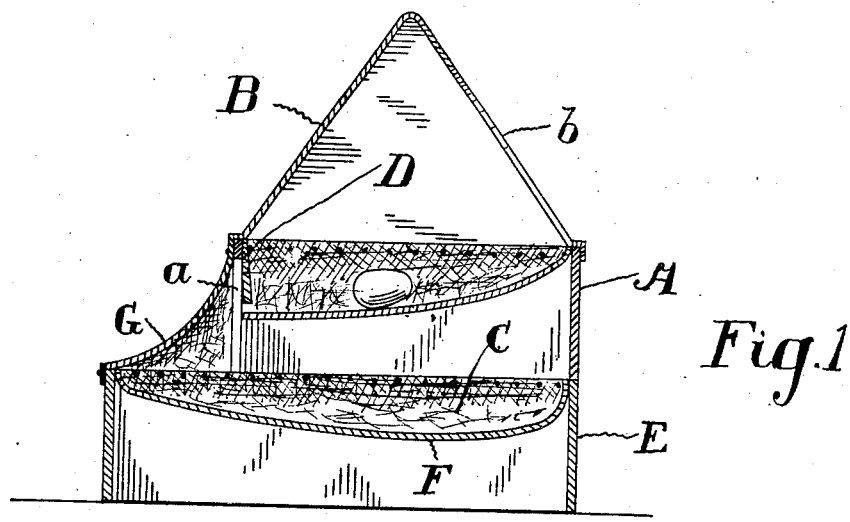
Figure 2:
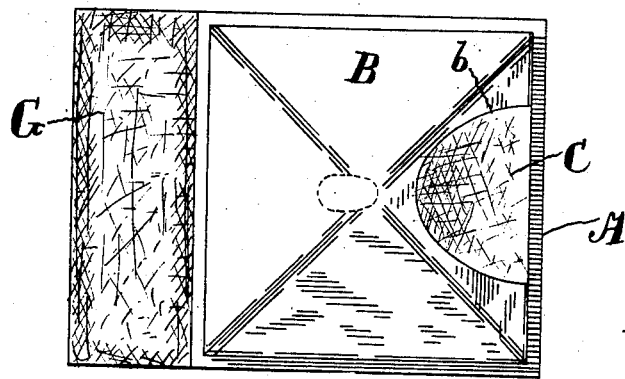
Figure 3:
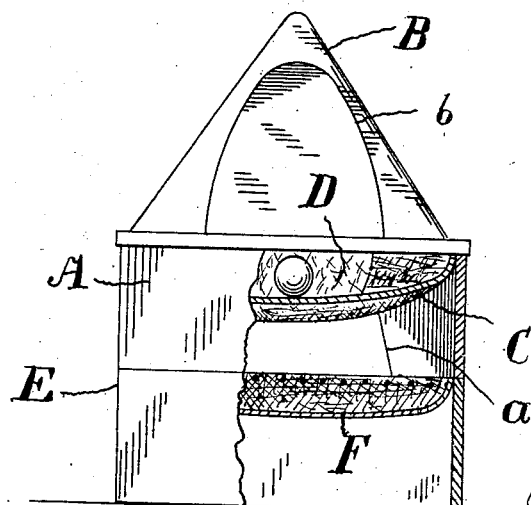

Figure 1 is a side sectional elevation of our improved nest. Fig. 2 is a plan view of the same. Fig. 3 is a front elevation of the same, partly in section.

In the drawings like letters of reference indicate corresponding parts in the different figures.

A is a nest-frame open above and below and provided with an aperture through the back. This nest-frame is provided with a cover B, preferably pyramidal in form and provided in its front with the opening $b$. Owing to the pyramidal shape of this cover, dust and dirt will not accumulate upon it so readily as upon a flat cover.

C is the nest-bottom, preferably formed of some suitable flexible fabric. This nest-bottom is open at its rear end and is slanted from the front toward this opening. A flap D, of flexible material, is preferably secured over this opening, so as to slightly protect the fall of the newly-laid egg.

The nest-frame is hinged upon the receptacle E. This receptacle is provided with a flexible soft bottom F, preferably oppositely inclined to the nest-bottom C. The receptacle, it will be seen, extends rearwardly beyond the opening $a$, through which the newly-laid eggs fall. A gap is thus left, which is covered by the canvas or other flexible covering G, suitably secured to the nest-frame and the receptacle. This canvas serves also as a hinge, so that the nest-frame may be swung back to permit of the eggs being removed from the receptacle. Of course other means might be employed for hinging the nest-frame to the receptacle.

A nest constructed in accordance with our invention will be found to possess many important advantages over nests of ordinary construction. Each egg as laid rolls away and is caught in the receptacle E, where it is out of sight of the hen and it becomes impossible for the latter to eat the eggs, a habit to which many hens are addicted. Our nest being completely covered in will prevent the eggs from being frozen through an undue time elapsing between the laying of the eggs and their removal from the nest. Further, as each egg is laid and passes out of sight, hens are discouraged from sitting, and stealing of the eggs by rats is prevented. As a matter of convenience an artificial nest-egg is tacked to the center of the nest-bottom. Such forms no part of our invention.

What we claim as our invention is—

1. In a nest a nest-frame provided with a flexible bottom having at its rear an aperture for the exit of eggs, the bottom inclining to the aperture in combination with a receptacle located below the nest-frame and extending rearwardly beyond the rear end thereof; and a flexible bottom for the receptacle inclined away from the point at which the eggs are received from the nest-frame, substantially as described.

2. In a nest a nest-frame provided with a flexible bottom having at its rear an aperture for the exit of eggs, the bottom inclining to the aperture in combination with a receptacle located below the nest-frame and extending rearwardly beyond the rear end thereof; a flexible bottom for the receptacle inclined away from the point at which the eggs are received from the nest-frame and a flexible covering secured to and inclosing the rear end of the nest-frame and the exposed top of the receptacle, substantially as described.

3. In a nest a nest-frame provided with a flexible bottom having at its rear an aperture for the exit of eggs, the bottom inclining to the aperture, in combination with a receptacle located below the nest-frame and extending rearwardly beyond the rear end thereof and a flexible bottom for the receptacle inclined away from the point at which the eggs are received from the nest-frame.

Paris, March 22, 1905.

JOSHUA PICKERING.
THOMAS PICKERING.

In presence of—
    JOHN PICKERING,
    GORDON J. SMITH.